US007876285B2

(12) United States Patent
Miyazawa

(10) Patent No.: US 7,876,285 B2
(45) Date of Patent: Jan. 25, 2011

(54) PROJECTION SYSTEM, INFORMATION PROCESSING APPARATUS, INFORMATION PROCESSING PROGRAM, RECORDING MEDIUM THEREFOR, PROJECTOR, COMPUTER PROGRAM THEREFOR, AND RECORDING MEDIUM THEREFOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 745 days.

(21) Appl. No.: 11/781,550

(22) Filed: Jul. 23, 2007

(65) Prior Publication Data
US 2008/0042922 A1    Feb. 21, 2008

(30) Foreign Application Priority Data

Aug. 17, 2006  (JP)  ............................. 2006-222295
Sep. 4, 2006   (JP)  ............................. 2006-238613

(51) Int. Cl.
*G09G 5/00*   (2006.01)

(52) U.S. Cl. ......................................... 345/1.2; 353/48

(58) Field of Classification Search ................ 345/1.2, 345/7, 9; 353/29, 30, 48, 89; 348/42, 333.1, 348/744; 359/462, 630
See application file for complete search history.

(56) References Cited

U.S. PATENT DOCUMENTS 7,114,813 B2 * 10/2006 Wada et al. ................... 353/70
7,133,083 B2 * 11/2006 Jaynes et al. ................. 348/745
7,554,692 B2 *  6/2009 Ajito .......................... 358/1.9

FOREIGN PATENT DOCUMENTS

JP    A 2004-069996    3/2004
JP    A 2006-235158    9/2006

* cited by examiner

*Primary Examiner*—Abbas I Abdulselam
(74) *Attorney, Agent, or Firm*—Oliff & Berridge, PLC

(57) ABSTRACT

A projection system includes: plural projectors that modulate a light beam on the basis of image data, each of the projectors including: an image-data restoring unit and an individual image correction processing unit; a signal transmitting device that connects an information processing apparatus and the projectors and transmits image data to the projectors; and information processing apparatus that includes: a common image correction processing unit and an image-data transmitting unit.

9 Claims, 13 Drawing Sheets

PROJECTION SYSTEM, INFORMATION PROCESSING APPARATUS, INFORMATION PROCESSING PROGRAM, RECORDING MEDIUM THEREFOR, PROJECTOR, COMPUTER PROGRAM THEREFOR, AND RECORDING MEDIUM THEREFOR

BACKGROUND

1. Technical Field

The present invention relates to a projection system, an information processing apparatus, an information processing program, a recording medium therefor, a projector, a computer program therefor, and a recording medium therefor.

2. Related Art

There is known a projection system in which an image processing unit of a personal computer serving as an information processing apparatus applies image correction processing such as shape correction and hue correction to an image source inputted to the personal computer and a projector projects image data subjected to the image correction processing to a screen (see, for example, JP-A-2004-69996).

The image data subjected to the image correction processing by the image processing unit of the personal computer is transmitted to the projector through a signal transmitting device such as a USB cable.

Examples of the image correction processing include trapezoidal correction (shape conversion) for correcting trapezoidal distortion caused by an arrangement relation between the projector and the screen, γ correction and VT-γ correction, which are color correction corresponding to an output characteristic of the projector, color unevenness correction for correcting luminance unevenness and color unevenness due to a characteristic of a liquid crystal panel, and ghost correction and crosstalk correction for correcting color unevenness (ghost and crosstalk) caused by a driving signal affecting near pixels when respective pixels of the liquid crystal panel are driven.

According to the structure of the projection system in the past, the image correction processing is mainly performed on the personal computer and the projector only projects the image data and does not perform the complicated image correction processing. Thus, it is possible to make the structure of the projector extremely simple. The personal computer originally has a function of image processing. Thus, the personal computer can perform highly accurate image correction processing without being specially added with a new function.

In recent years, various projection methods performed by using two or more projectors are adopted. For example, there are stack projection for superimposing projected images from the respective projectors in an identical projection area to display a high intensity image and tiling protection for causing the respective projectors to display partial images of an image that should be displayed on the basis of image data and arrange the respective partial images in parallel to form one display image and display a high definition image.

When such projection methods are adopted, in the projection system disclosed in JP-A-2004-69996, since the image data transmitted to the plural projectors is subjected to the image correction processing by the image processing unit of the personal computer, loads applied to the personal computer are extremely heavy. Thus, it is necessary to use a high-performance personal computer or use plural personal computers.

Moreover, it is necessary to transmit separate image data obtained by performing individual kinds of image correction processing corresponding to the respective projectors to the projectors. Thus, a transmission load applied to the USB cable or the like is heavy and it is impossible to appropriately display bulk image data such as a moving image.

SUMMARY

An advantage of some aspects of the invention is to provide a projection system, an information processing apparatus, an information processing program, a recording medium therefor, a projector, a computer program therefor, and a recording medium therefor that can reduce loads applied to the information processing apparatus even when the stack projection and the tiling projection are performed using plural projectors and can appropriately display bulk data such as a moving image.

A projection system according to an aspect of the invention is a projection system including: plural projectors respectively including: an image-data restoring unit that converts transmission data transmitted from a information processing apparatus to image data; an individual image correction processing unit that applies individual kinds of image correction processing corresponding to each of the projectors to the image data converted by the image-data restoring unit; and an image projecting unit that modulates a light beam emitted from a light source on the basis of corrected image data corrected by the individual image correction processing unit and projects an image; a signal transmitting device that connects an information processing apparatus and the respective projectors and transmits the transmission data generated by the information processing apparatus to the respective projectors; and the information processing apparatus including: a common image correction processing unit that generates image data obtained by applying image correction processing common to the respective projectors to the image source in order to cause each of the projectors to display an appropriate image; and an image-data transmitting unit that converts the image data generated by the common image correction processing unit into the transmission data and transmits the transmission data to the respective projectors through the signal transmitting device.

According to such a constitution, since the information processing apparatus includes the common image correction processing unit, it is possible to collectively perform the image correction processing common to the respective projectors. Thus, it is possible to reduce the image correction processing in the entire projection system.

Further, since the respective projectors include the individual image correction processing unit, it is possible to perform the individual kinds of image correction processing corresponding to the respective projectors. Thus, it is possible to cause the entire projection system to display an appropriate image even if the stack projection and the tiling projection are performed and it is possible to reduce loads applied to the image processing apparatus.

Moreover, the identical image data subjected to the image correction processing by the common image correction processing unit of the image processing apparatus is transmitted to the respective projectors. Thus, it is possible to reduce a transmission load applied to the signal transmitting device and it is possible to appropriately display bulk image data such as a moving image.

It is preferable that the protection system is a stack projection system that superimposes and displays projected images of the respective projectors in an identical projection area.

According to such a constitution, the respective projectors superimpose and display the projected images of the respective projectors in the identical projection area on the basis of the identical image data transmitted from the information processing apparatus. Thus, it is possible to display a high intensity image.

It is preferable that the projection system is a tiling projection system that causes the respective projectors to display partial images of an image that should be displayed on the basis of the image data and arrange the respective partial images in parallel to form one display image.

According to such a constitution, the respective projectors display partial images of the image that should be displayed on the basis of the image data transmitted from the image processing apparatus and arrange the respective partial images in parallel to form one display image. Thus, it is possible to display a high definition image.

It is preferable that the information processing apparatus includes an image-data dividing unit that divides the image data into partial image data that should be displayed by the respective projectors.

According to such a constitution, processing for dividing the image data into the partial image data is performed by the image processing apparatus. Thus, it is unnecessary to perform the processing for dividing the image data into the partial image data in the respective projectors and it is possible to reduce loads applied to the respective projectors.

It is preferable that each of the projectors includes an image-data dividing unit that divides the image data into partial image data that should be displayed by the respective projectors.

According to such a constitution, the respective projectors perform the processing for dividing the image data into the partial image data. Thus, it is unnecessary to perform the processing for dividing the image data into the partial image data in the information processing apparatus and it is possible to reduce loads applied to the information processing apparatus.

It only has to be determined, according to functions and performance of the information processing apparatus, the respective projectors, and the signal transmitting device constituting the projection system, in which of the information processing apparatus and the respective projectors the processing for dividing the image data into the partial image data should be performed.

It is preferable that the respective projectors include an image-data slicing unit that slices partial image data that should be displayed by the respective projectors from the image data.

According to such a constitution, the respective projectors perform processing for slicing the partial image data displayed by the respective projectors themselves from the image data. Thus, it is unnecessary to perform the processing for dividing the image data into the partial image data in the information processing apparatus and it is possible to reduce loads applied to the information processing apparatus.

An information processing apparatus according to another aspect of the invention is an information processing apparatus including: a common image correction processing unit that generates, in order to cause each of plural projectors to display an appropriate image, image data obtained by applying image correction processing common to the respective projectors to an inputted image source; and an image-data transmitting unit that converts the image data generated by the common image correction processing unit into predetermined transmission data and transmitting the transmission data to the respective projectors through a signal transmitting device.

According to such a constitution, it is possible to enjoy actions and effects same as the actions and the effects of the projection system described above.

According to still another aspect of the invention, there is provided an information processing program that causes an image processing apparatus to operate as described above.

According to still another aspect of the invention, there is provided a computer-readable recording medium having this program recorded therein.

A projector according to still another aspect of the invention is a projector including: an individual image correction processing unit that applies individual kinds of image correction processing corresponding to the respective projectors to the image data obtained by applying image correction processing common to plural projectors to an image source in an image processing apparatus; and an image projecting unit that modulates a light beam emitted from a light source on the basis of corrected image data corrected by the individual image correction processing unit and projects an image.

According to such a constitution, it is possible to enjoy actions and effects same as the actions and the effects of the projection system described above.

According to still another aspect of the invention, there is provided a computer program that causes a projector to operate as described above.

According still another aspect of the inventions there is provided a computer-readable recording medium having this program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be hereinafter explained with reference to the accompanying drawings.

First Embodiment

A projection system according to a first embodiment of the invention will be explained.

Figure 1:
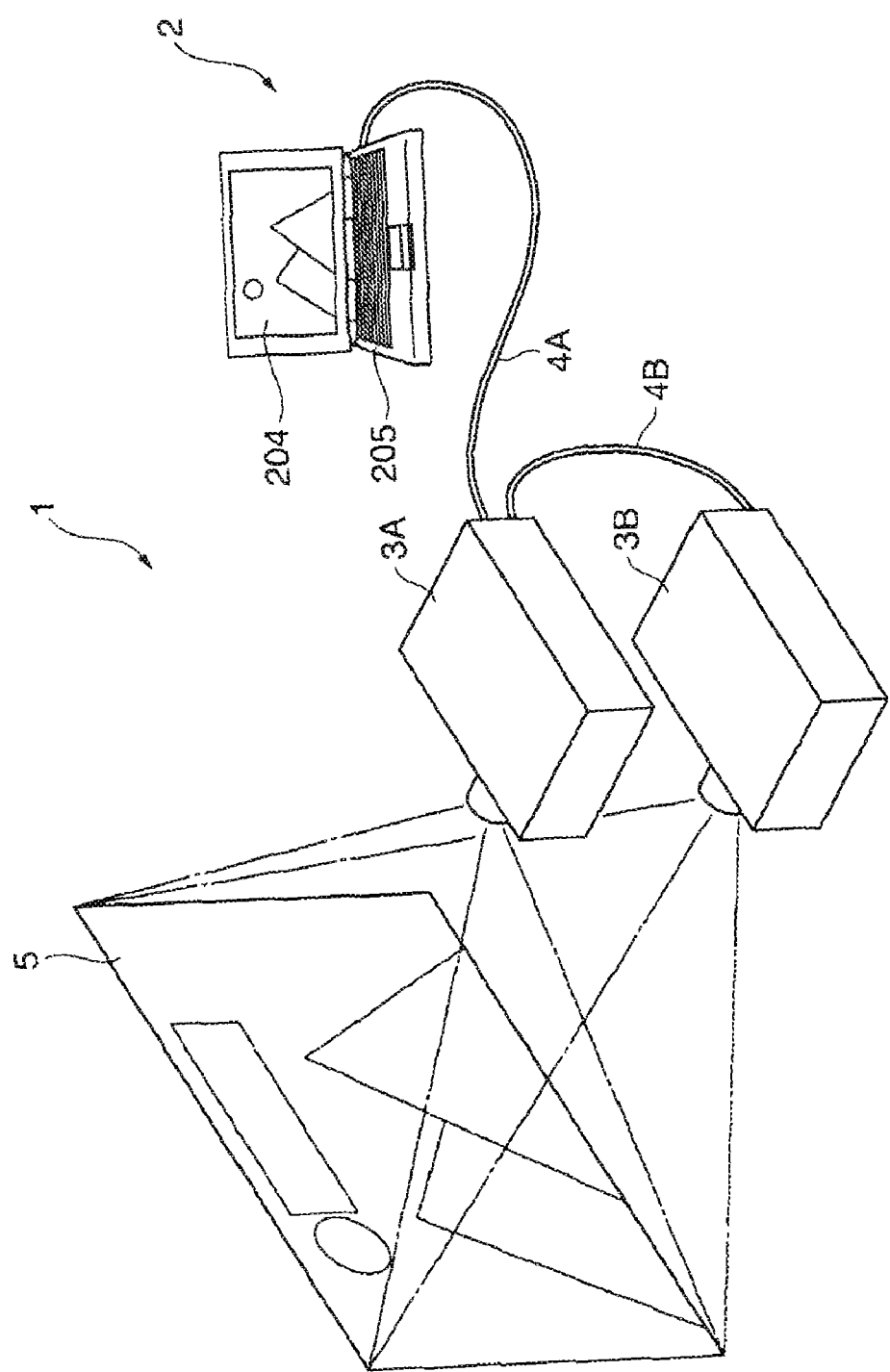
FIG. 1 is an external view showing serial connection of a projection system according to a first embodiment of the invention.

A projection system 1 according to this embodiment is, as shown in FIG. 1, a stack projection system that superimposes and displays projected images of two projectors in an identical projection area.

The projection system 1 includes a personal computer (an image processing apparatus) 2, two projectors 3A and 3B, and USB cables (a signal transmitting devices) 4A and 4B.

The projectors 3A and 3B modulate a light beam emitted from a light source on the basis of image data generated by the personal computer 2 and expand and project the light beam to display an image on a screen 5.

The personal computer 2 and the projector 3A are connected through the USB cable 4A. The projector 3A and the projector 3B are connected through the USB cable 4B. Such a connection method is hereinafter referred to as serial connection.

Figure 2:
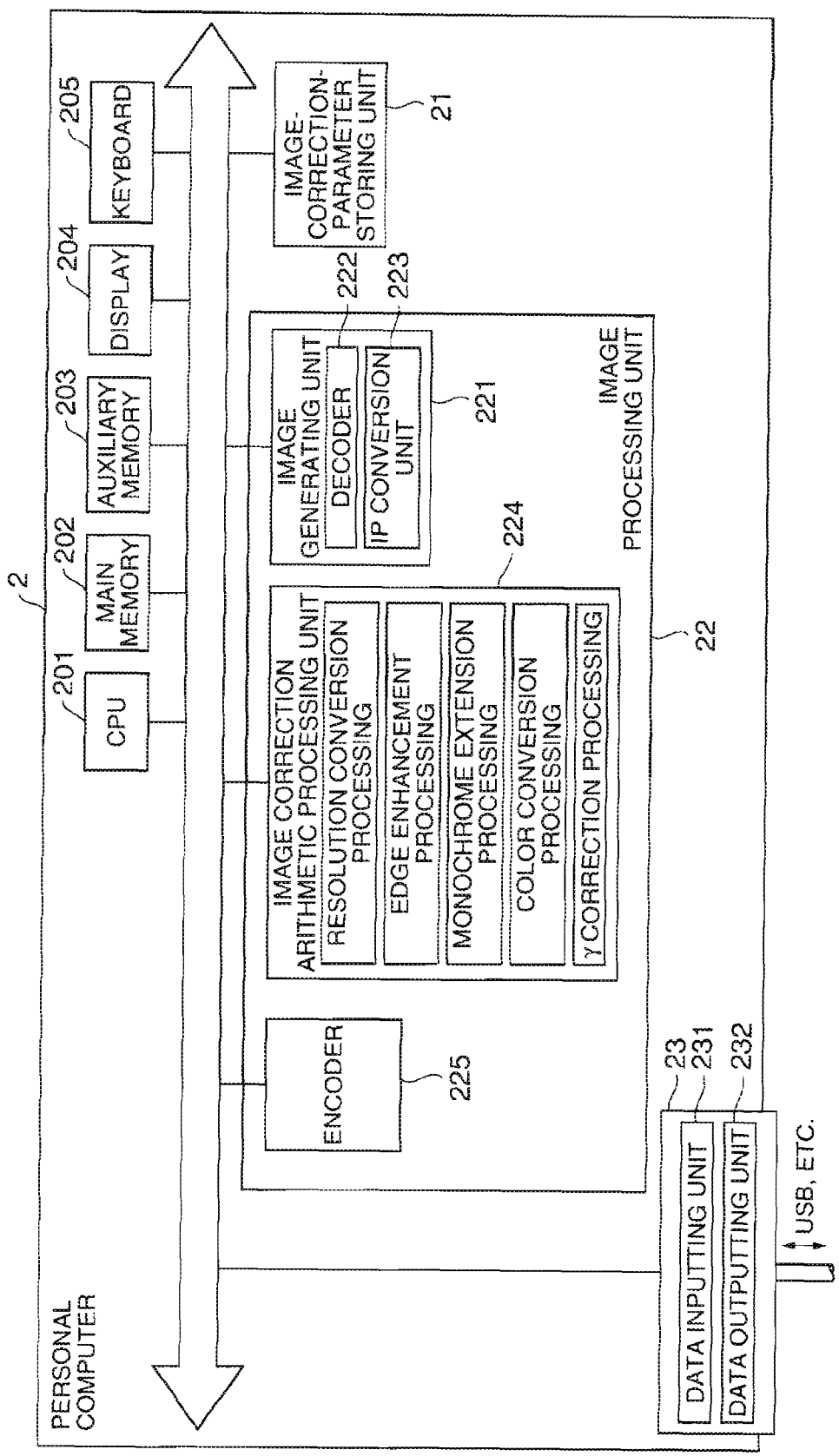
FIG. 2 is a functional block diagram of personal computer according to the first embodiment.

The personal computer 2 includes, as shown in FIG. 2, a CPU 201, a main memory 202, an auxiliary memory 203, a display 204, a keyboard 205, an image-correction-parameter storing unit 21, an image processing unit 22, and a USB connector 23.

As the auxiliary memory 203, for example, a medium such as a DVD (Digital Versatile Disc) having recorded therein videos (image sources) and sound as digital data is used.

The image-correction-parameter storing unit 21 stores, in order to cause each of the projectors 3A and 3B to appropriately display an image, correction parameters for applying image correction processing common to the respective projectors to an image source.

A memory card or a CD-ROM having these correction parameters recorded therein may be inserted and installed in the personal computer 2 to store the correction parameters in the image-correction-parameter storing unit 21.

When the personal computer 2 and the projector 3A are connected by the USB cable 4A, the personal computer 2 may store predetermined correction parameters acquired from the projector 3A in the image-correction-parameter storing unit 21.

The image processing unit 22 includes an image generating unit 221, an image correction arithmetic processing unit (common image correction processing unit) 224, and an encoder 225.

The image generating unit 221 includes a decoder 222 and an IP (Interlace Progressive) conversion unit 223. The image generating unit 221 applies decoding processing corresponding to a recording system of an image source read out from the auxiliary memory 203 to the image source and decodes image data in a unit of frame.

The decoder 222 decodes an image source encoded in the format of MPEG2 or the like and generates image data.

The IP conversion unit 223 converts an mage source of an interlace system such as NTSC or PAL into image data of a progressive system for a fixed-pixel display device (a liquid crystal panel, etc.).

The image correction arithmetic processing unit 224 applies common image correction processing to the image data decoded by the image generating unit 221 on the basis of the correction parameters stored in the image-correction-parameter storing unit 21.

As the image correction processing, there are, for example, image correction processing corresponding to characteristics common to the respective projectors (hereinafter referred to as common image correction processing) such as image correction processing corresponding to models of the projectors and image correction processing corresponding to characteristics peculiar to the respective projectors (hereinafter referred to as individual image correction processing).

In this embodiment, image correction processing such as resolution conversion, edge enhancement, monochrome extension, color conversion, and γ correction corresponds to the common image correction processing.

Image correction processing such as shape conversion, VT-γ correction, ghost correction, crosstalk correction, and color unevenness correction corresponds to the individual image correction processing.

Depending on a structure of a projector, color unevenness caused by an influence of other pixels is referred to as crosstalk or ghost. Crosstalk is unevenness of an image caused when a pixel is driven by a leak current of a signal to a pixel adjacent thereto. Ghost is a phenomenon in which videos deviate from each other and look overlapped.

The encoder 225 calculates a difference between image frames in the image data subjected to the image correction processing by the image correction arithmetic processing unit 224, detects a changed portion of the image data, and sets the portion as difference data.

The encoder 225 encodes the difference data detected into a format that can be transmitted by the USB cables 4A and 4B, for example, a format such as USB 2.0.

The USB connector 23 includes a data inputting unit 231 and a data outputting unit 232. The USB connector 23 performs data input and output between the personal computer 2 and the projector 3A through the USB cable 4A.

In this embodiment, the encoder 225 and the USB connector 23 constitute an image-data transmitting unit.

A structure of the projectors 3A and 3B will be explained.

Figure 3:
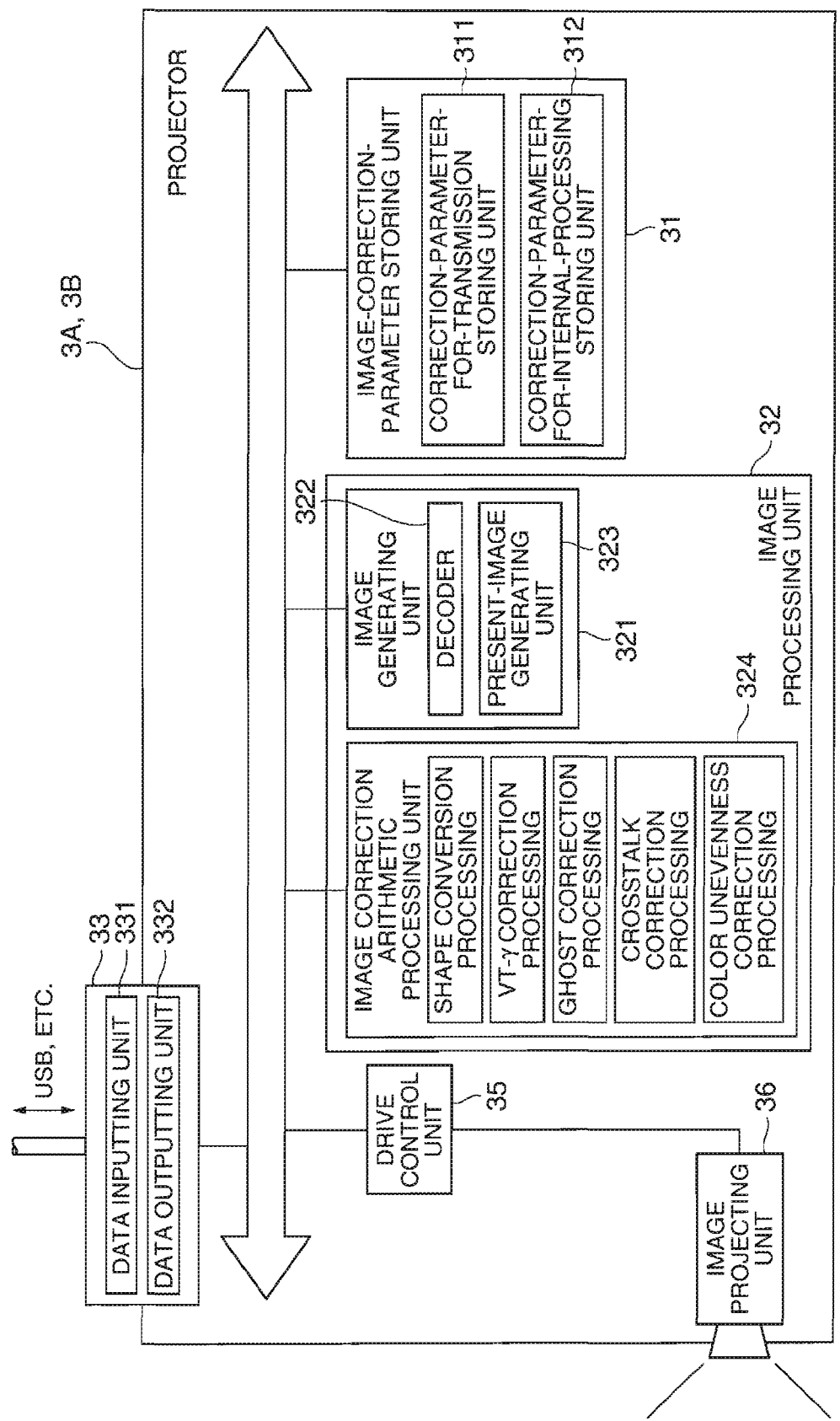
FIG. 3 is a functional block diagram of a projector according to the first embodiment.

The projectors 3A and 3B include, as shown in FIG. 3, image-correction-parameter storing units 31, image processing units 32, USB connectors 33, drive control units 35, and image protecting units 36.

The image-correction-parameter storing units 3 include correction-parameter-for-transmission storing units 311 and correction-parameter-for-internal-processing storing units 312.

The correction-parameter-for-transmission storing units 311 store correction parameters for performing the common image correction processing, i.e., the image correction processing such as resolution conversion, edge enhancement, monochrome extension, color conversion, and γ correction in the personal computer 2.

The correction-parameter-for-internal-processing storing units 312 store correction parameters for performing the individual image correction processing, i.e., the image correction processing such as shape conversion, VT-γ correction, ghost correction, crosstalk correction, and color unevenness correction by respective projectors.

As described above, the image-correction-parameter storing unit 21 of the personal computer 2 stores correction parameters acquired by the personal computer 2 from the correction-parameter-for-transmission storing unit 311 of the projector 3A through the USB cable 4A when the personal computer 2 and the projector 3A are connected by the USB cable 4A.

The image processing units 32 include image generating units (image-data restoring unit) 321 and image correction arithmetic processing units (individual image correction processing unit) 324.

The image generating units 321 include decoders 322 and present-image generating units 323.

The decoders 322 decode encoded difference data transmitted from the personal computer 2. Since the difference data transmitted from the personal computer 2 is encoded by the encoder 225, the difference data is obtained by being decoded by the decoders 322.

The present-image generating units 323 combine the difference data decoded with image data presently projected to generate present image frames anew.

The image correction arithmetic processing units 324 apply the individual image correction processing, i.e., the image correction processing such as shape conversion, VT-γ correction, ghost correction, crosstalk correction, and color unevenness correction to the present image frames generated by the present-image generating units 323 on the basis of the correction parameters stored in the correction-parameter-for-internal-processing storing units 312.

The drive control units 35 output control signals for driving the image projecting units 36 to display the present image frames subjected to the image correction processing.

Figure 4:
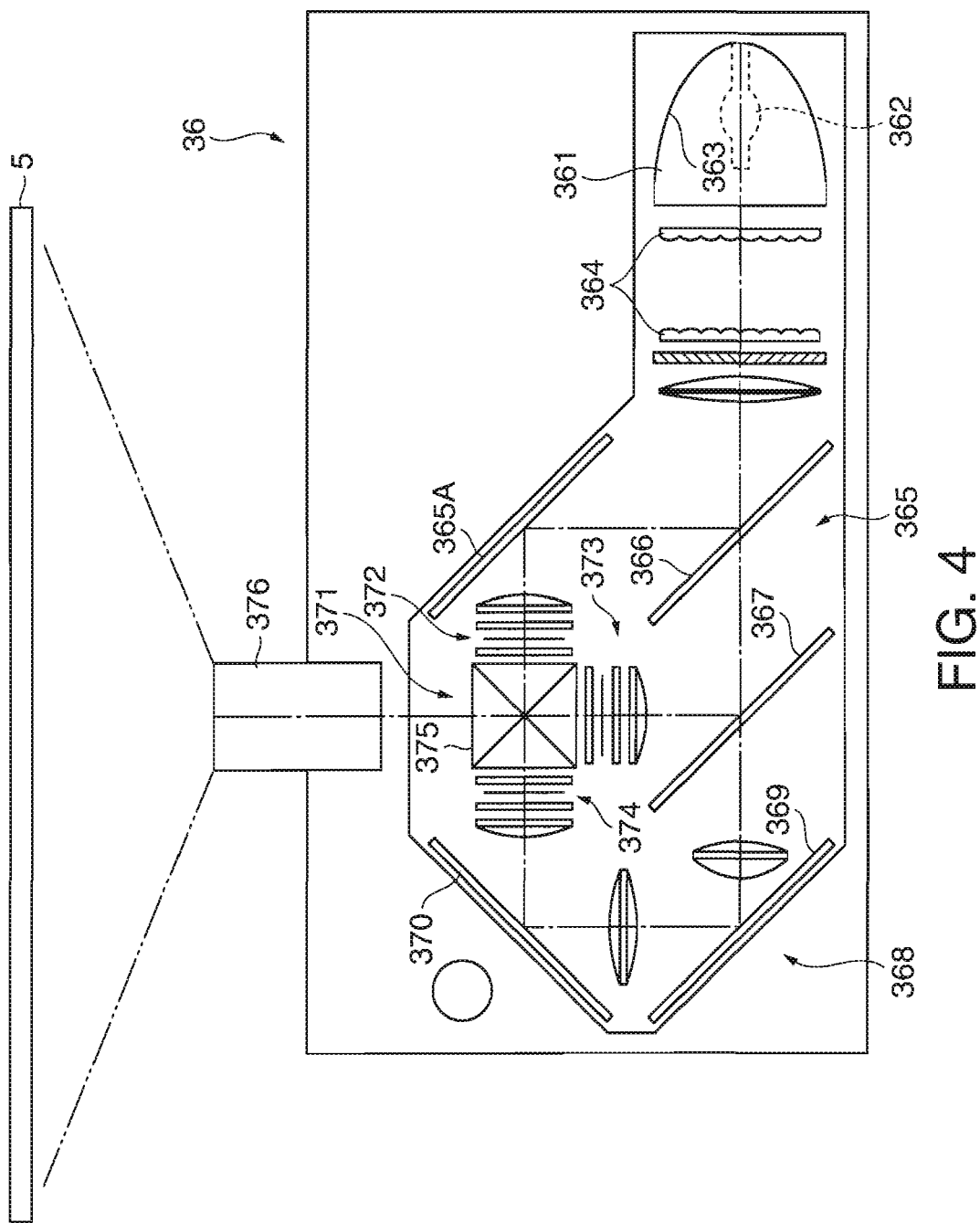
FIG. 4 is a diagram showing a structure of an image projecting unit of the projector according to the first embodiment.

As shown in FIG. 4, the image projecting units 36 include light source units 361. Lights from light sources 362 are converted into parallel light beams by reflectors 363 and travel to color separation optical systems 365 passing through two lens arrays 364.

The color separation optical systems 365 include dichroic mirrors 366 that reflect red light and transmit blue and green light and dichroic mirrors 367 that reflect green light and transmit blue light. The color separation optical systems 365 separate light into red light, green light, and blue light.

The red light is reflected by reflecting mirrors 365A, the green light is reflected by the dichroic mirrors 367, and the blue light is guided to relay optical systems 368 including two reflecting mirrors 369 and 370. The red light, the green light, and the blue light are made incident on liquid crystal panels (light modulating devices) for red 372, liquid crystal panels (light modulating devices) for green 373, and liquid crystal panels (light modulating devices) for blue 374 of electro-optic devices 371, respectively. The respective color lights are subjected to predetermined modulation corresponding to image information in the respective liquid crystal panels 372 to 374 and combined by prisms 375.

Images obtained by combining the respective color lights are emitted from projection optical systems 376 and expanded and projected on the screen 5.

The USB connectors 33 include data inputting units 331 and data outputting units 332. The USB connectors 33 perform data input and output between the personal computer 2 and the projector 3A through the USB cable 4A and perform data input and output between the projector 3A and the projector 3B through the USB cable 4B.

Operations of the projection system 1 according to this embodiment will be explained with reference to a flowchart in FIG. 5.

Figure 5:
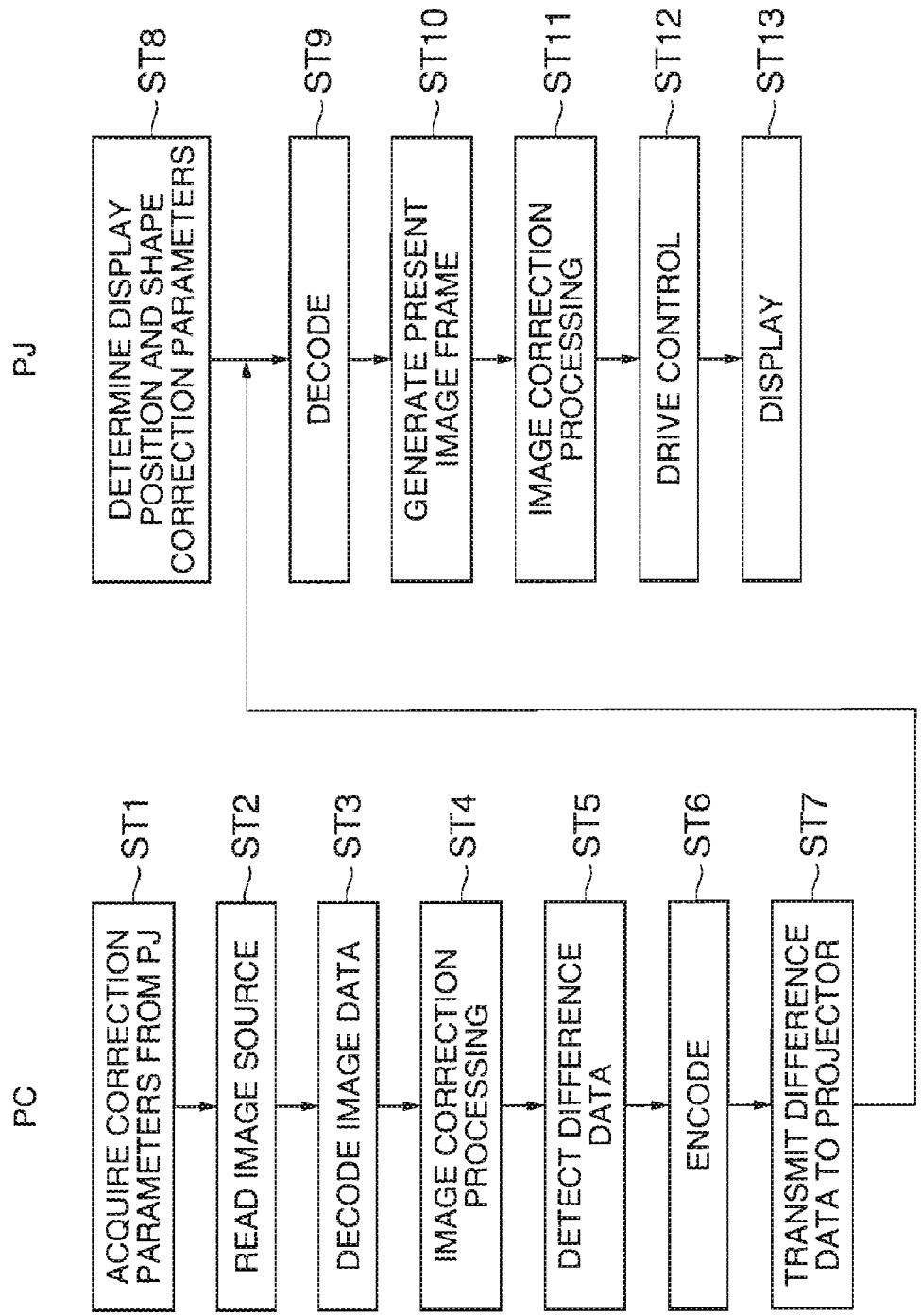
FIG. 5 is a flowchart for explaining operations of the projection system according to the first embodiment.

In FIG. 5, ST1 to ST7 on the left side indicate operations of the personal computer (PC) 2 and ST8 to ST13 on the right side indicate operations of the projectors (PJs) 3A and 3B.

When a user of the projection system 1 serially connects the projection system 1, the personal computer 2 executes steps ST1 to ST7 described below.

A computer program for causing the personal computer 2 to execute the operations of the projection system 1 is stored in the main memory 202 of the persona computer 2.

First, when the personal computer 2 is connected to the projectors 3A and 3B, the personal computer 2 receives apparatus information of the respective projectors from the respective projectors.

In ST1, the personal computer 2 reads out the correction parameters from the correction-parameter-for-transmission storing unit 311 of the projector 3A and acquires the correction parameters through the USB cable 4A. The image-correction-parameter storing unit 21 stores the correction parameters acquired by the personal computer 2.

In ST2, the image generating unit 221 reads out an image source from the auxiliary memory 203 (e.g., a DVD).

In ST3, the decoder 22 decodes the image source encoded in the format of MPEG2 or the like and generates image data.

In ST4 the image correction arithmetic processing unit 224 applies the common image correction processing to the image data decoded by the image generating unit 221 (a common image correction processing procedure). In this embodiment, the image correction arithmetic processing unit 224 performs respective kinds of image correction processing of resolution conversion processing, edge enhancement processing, monochrome extension processing, color conversion processing, and γ correction processing as the common image correction processing.

In ST5, the encoder 225 calculates a difference between image frames in the image data subjected to the image correction processing by the image correction arithmetic processing unit 224, detects a changed portion of the image data, and sets the portion as difference data.

In ST6, the encoder 225 encodes the difference data detected.

In ST7, the personal computer 2 transmits the difference data encoded to the projector 3A through the USB cable 4A.

In this embodiment, an image data transmission procedure is ST5 to ST7.

When the projector 3A receives the encoded difference data, the projector 3A transmits the encoded difference data to the projector 3B through the USB cable 4B.

When the projectors 3A and 3B receive the difference data, the projectors 3A and 3B execute ST8 to ST13 described below.

First, in ST8, the correction-parameter-for-internal-processing storing units 312 store correction parameters for performing shape conversion based on adjustment of a display position and a display shape at the time when the projectors 3A and 3B perform stack projection.

In ST9, the decoders 322 decode the encoded difference data transmitted from the personal computer 2.

In ST10, the present-image generating units 323 combine the difference data decoded by the decoders 322 with the image data presently projected to generate present image frames anew.

In ST11, the image correction arithmetic processing units 324 apply the individual image correction processing to the present image frames generated (an individual image correction processing procedure). In this embodiment, the image correction arithmetic processing units 324 perform respective kinds of image correction processing of shape conversion processing, VT-γ correction processing, cross-talk correction processing, ghost correction processing, and color unevenness correction processing as the individual image correction processing.

In ST12, the drive control units 35 output control signals to the image protecting units 36 to display the present image frames subjected to the image correction processing.

In ST13, the image projecting units 36 expand and project images to the screen 5 and the images are displayed on the screen 5.

In the projection system 1 according to this embodiment, the following effects are realized.

(1) Since the personal computer 2 includes the image correction arithmetic processing unit 224, it is possible to collectively perform the image correction processing common to the projectors 3A and 3B. Thus, it is possible to reduce the image correction processing in the entire projection system 1.

(2) Since the projectors 3A and 3B include the image correction arithmetic processing units 324, it is possible to perform the individual image correction processing corresponding to the respective projectors. Thus, it is possible to display an appropriate image in the entire projection system 1 even if the stack projection is performed and it is possible to reduce loads applied to the personal computer 2.

(3) Projected images of the respective projectors are superimposed and displayed on the identical screen 5 by the projectors 3A and 3B on the basis of identical image data transmitted from the personal computer 2. Thus, it is possible to display a high intensity image.

Second Embodiment

A projection system according to a second embodiment of the invention will be explained.

In the following explanation, the components already explained are denoted by the identical reference numerals and signs and explanations of the components are omitted.

In the projection system 1 according to the first embodiment, the personal computer 2 and the projectors 3A and 3B are connected by the serial connection. However, the projection system 1 according to the second embodiment is different in a method of connecting the persona computer 2 and the projectors 3A and 3B.

Figure 6:
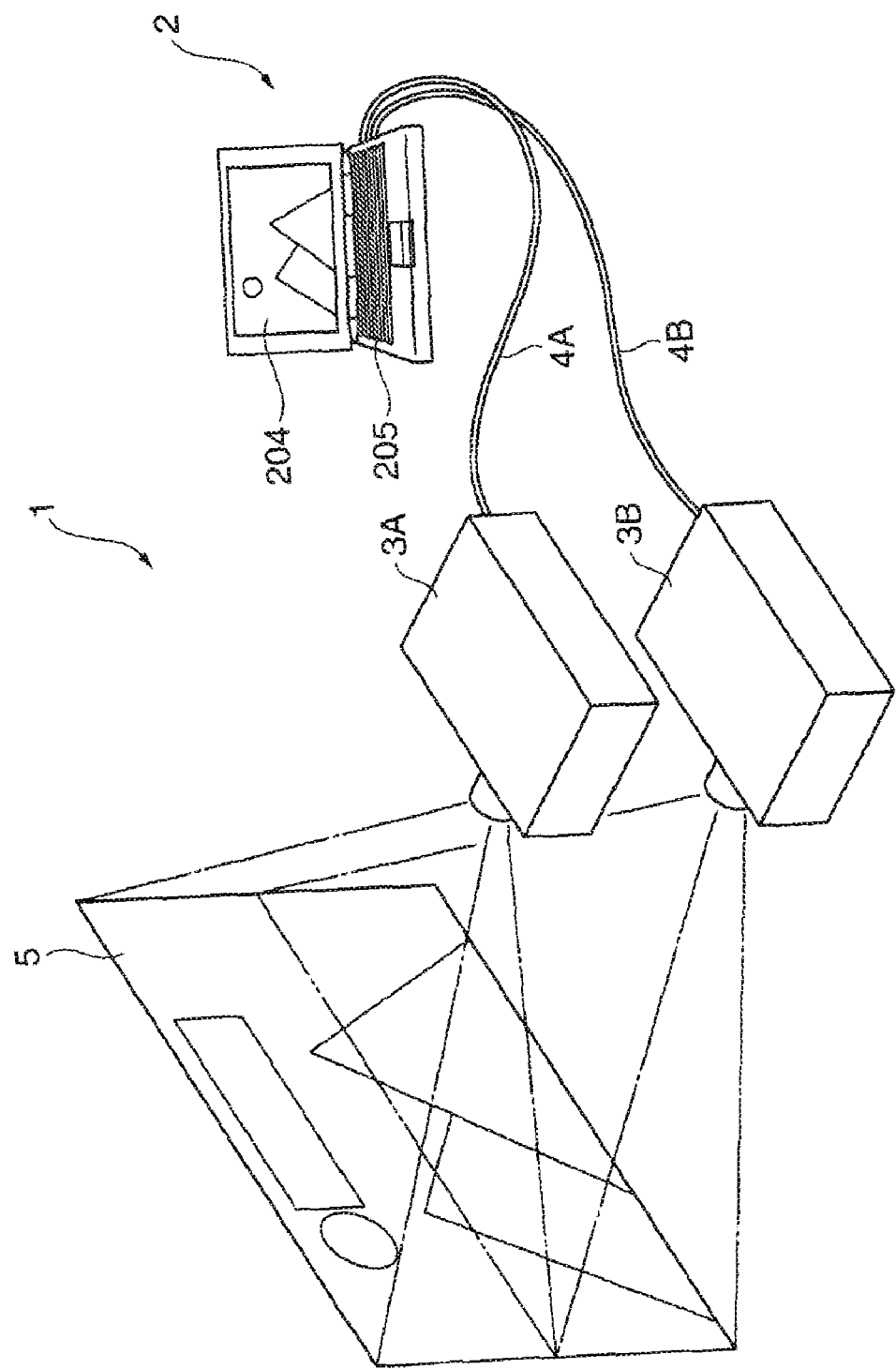
FIG. 6 is an external view showing parallel connection of a projection system according to a second embodiment of the invention.

As shown in FIG. 6 the personal computer 2 and the projector 3A are connected through the USB cable 4A. The personal computer 2 and the projector 3B are connected through the USB cable 4B. Such a connection method is hereinafter referred to as parallel connection.

The projection system 1 according to the first embodiment is the stack projection system that superimposes and displays projected images of the two projectors in the identical projection area. However, the projection system 1 according to the second embodiment is different in that the projection system 1 is a tiling projection system that causes the two projectors to display partial images of an image that should be displayed on the basis of image data and arrange the respective partial images in parallel to form one display image.

Figure 7:
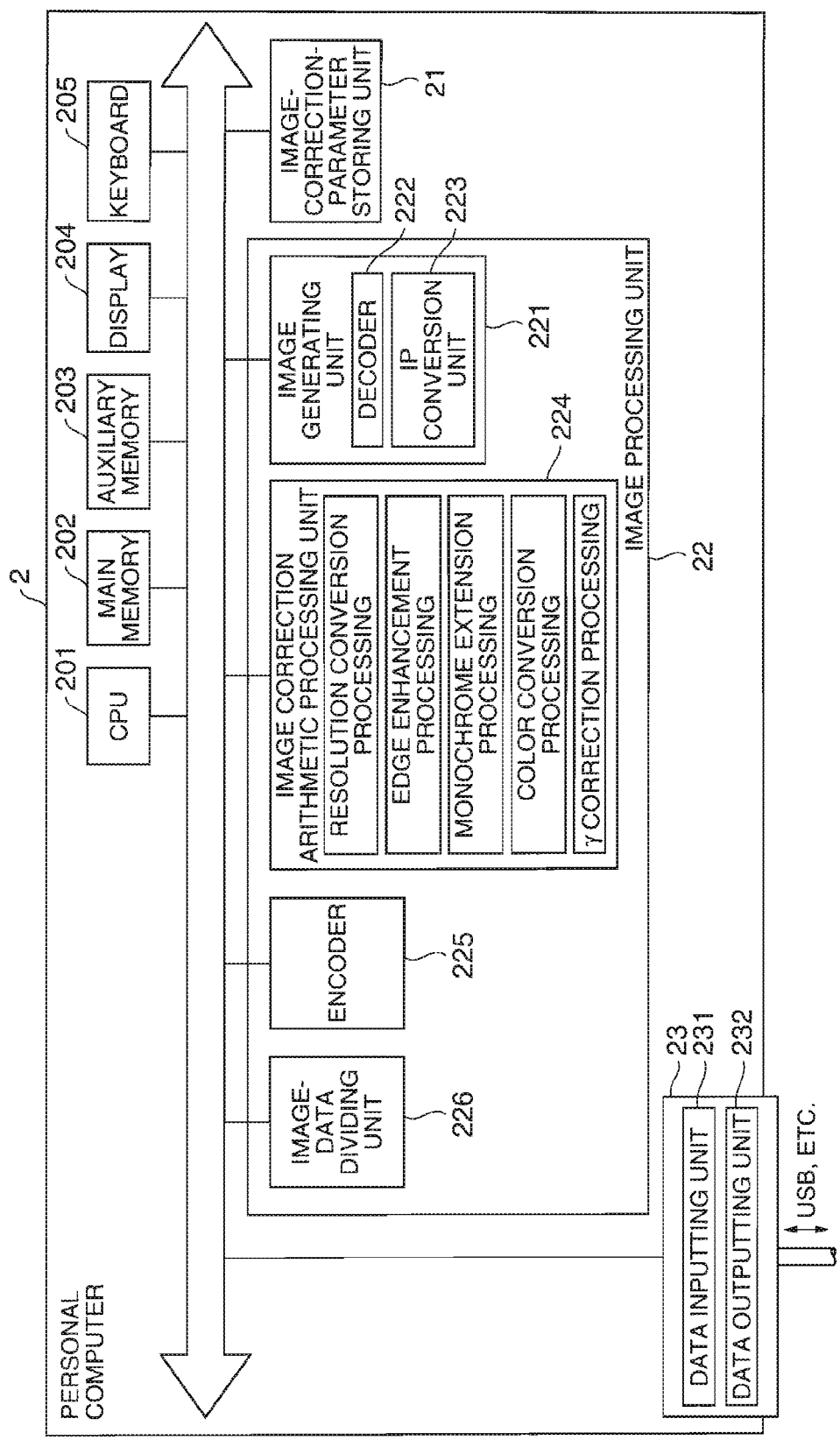
FIG. 7 is a functional block diagram of a personal computer according to the second embodiment.

Therefore, in the projection system 1 according to this embodiment, as shown in FIG. 7, the image processing unit 22 of the personal computer 2 includes an image-data dividing unit (image-data dividing unit) 226.

The image-data dividing unit 226 divides, when the projectors 3A and 3B perform tiling projection, image data subjected to the image correction processing by the image correction arithmetic processing unit 224 to arrange projected images of the respective projectors in parallel and form one display image on the screen 5. In other words, the image-data dividing unit 226 generates partial image data of a partial image that should be displayed by the projector 3A and partial image data of a partial image that should be displayed by the projector 3B.

The image-correction-parameter storing unit 21 stores parameters for performing division of image data (starting point coordinates concerning starting point positions and end point coordinates concerning end point positions of ranges of the respective partial image data, etc. in the image data).

A memory card or a CD-ROM having recorded therein the parameters for performing division of image data may be inserted and installed in the personal computer 2 to store the parameters in the image-correction-parameter storing unit 21.

When the personal computer 2 and the projectors 3A and 3B are connected by the USB cables 4A and 4B, the personal computer 2 may store the parameters for performing division of image data acquired from the respective projectors in the image-correction-parameter storing unit 21.

In this case, the correction-parameter-for-transmission storing units 311 of the respective projectors store the parameters for performing division of image data.

Figure 8:
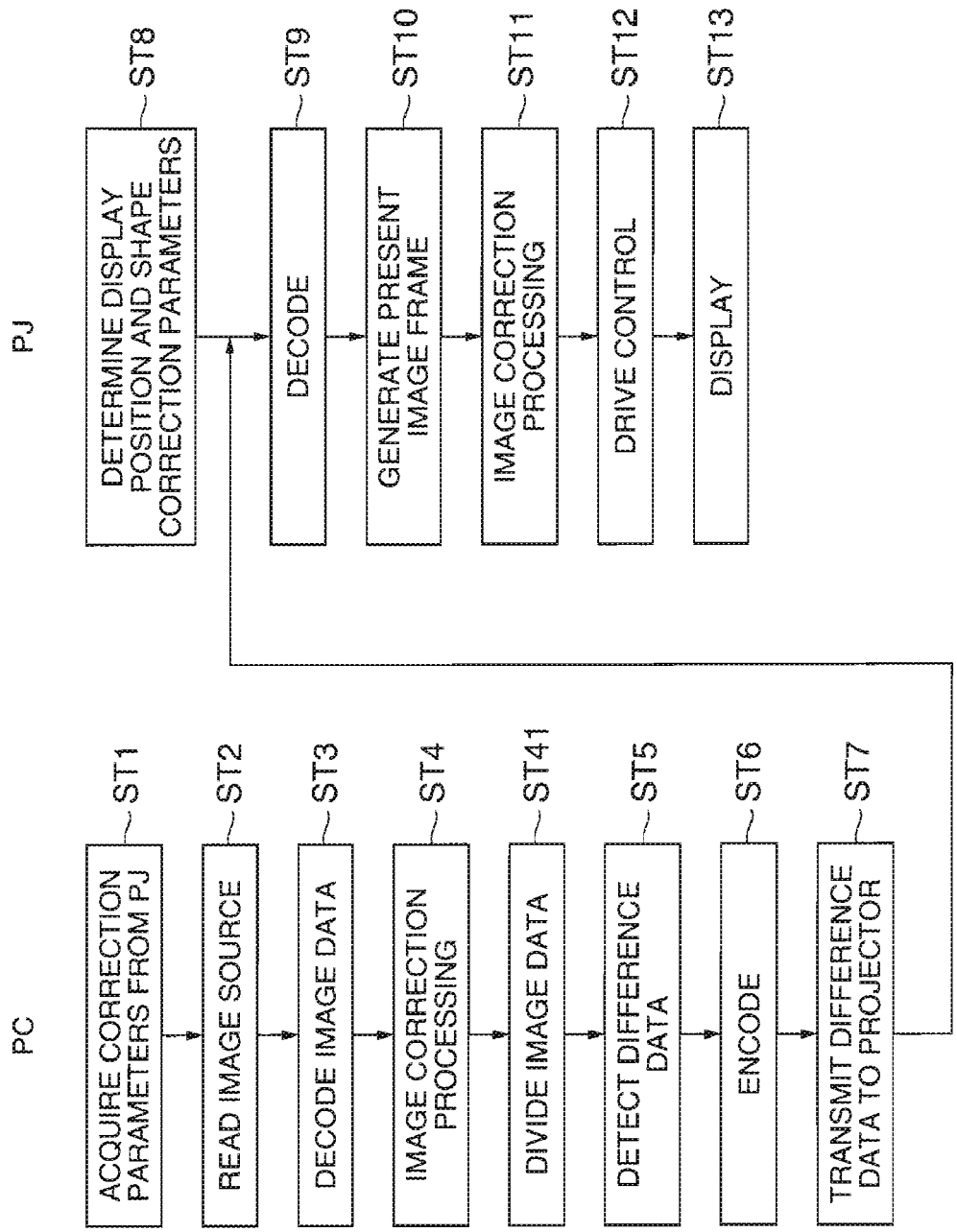
FIG. 8 is a flowchart for explaining operations of the projection system according to the second embodiment.

Concerning operations of the projection system 1 according to this embodiment, as shown in a flowchart in FIG. 8, in ST41, the image-data dividing unit 226 divides the image data subjected to the image correction processing by the image correction arithmetic processing unit 224. The processing in ST5 and the subsequent steps is applied to the respective partial image data divided. Thus, whereas the difference data transmitted in ST7 is same data for the respective projectors in the first embodiment, the difference data is data different for each of the projectors in this embodiment.

In this embodiment, it is possible to obtain actions and effects same as (1) and (2) in the first embodiment.

Moreover, the projectors 3A and 3B display partial images of an image that should be displayed on the basis of image data transmitted from the personal computer 2 and arrange the respective partial images in parallel to form one display image. Thus, it is possible to display a high definition image.

The processing for dividing the image data into the partial image data is performed by the personal computer 2. Thus, it is unnecessary to perform the processing for dividing the image data into the partial image data in the respective projectors and it is possible to reduce loads applied to the respective projectors.

In this embodiment, the division of the image data is performed after the image data is subjected to the image correction processing by the image correction arithmetic processing unit 224. However, the image correction processing may be performed by the image correction arithmetic processing unit 224 after the division of the image data is performed.

In this embodiment, a part of the individual image correction processing performed by the respective projectors may be performed in the personal computer 2.

In this case, the personal computer 2 reads out a part of the correction parameters from the correction-parameter-for-internal-processing storing units 312 of the respective projectors and acquires the correction parameters through the respective USB cables. The image-correction-parameter storing unit 21 stores the part of the correction parameters acquired by the personal computer 2. Subsequently, the image-data dividing unit 226 only has to divide the image data subjected to the image correction processing by the image correction arithmetic processing unit 224 and, then, apply the individual image correction processing to the respective partial image data on the basis of the part of the correction parameters acquired from the projectors that display the partial image data.

In this way, if a part of the individual image correction processing is performed by the personal computer 2, it is possible to appropriately determine a balance of loads between the personal computer and the projectors according to functions, performance, and the like of the personal computer and the projectors.

In particular, this is effective in performing the image correction processing using the high-performance personal computer 2. It is possible to reduce loads applied to the respective projectors.

Third Embodiment

A projection system according to a third embodiment of the present invention will be explained.

Figure 9:
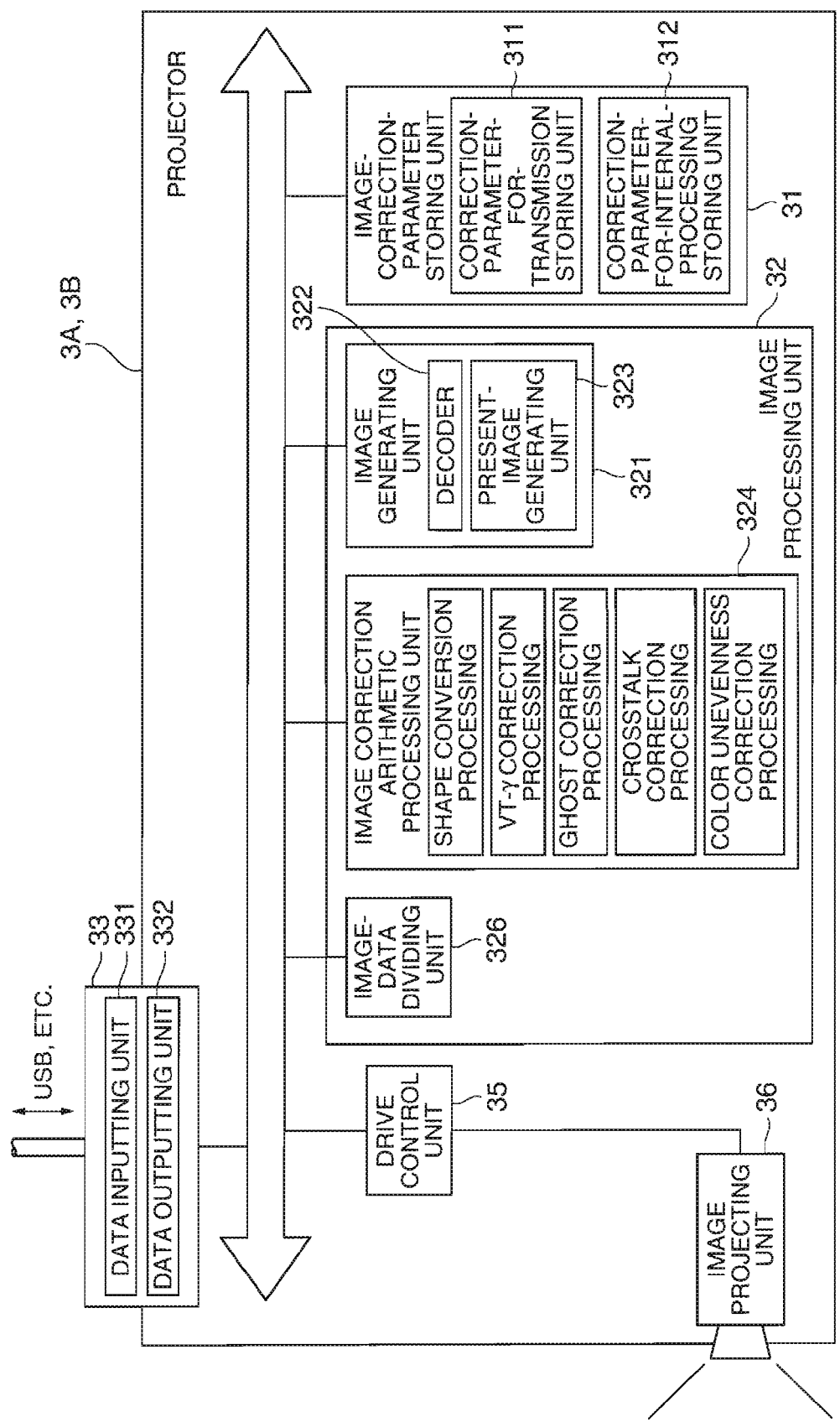
FIG. 9 is a functional block diagram of a projector according to a third embodiment of the invention.

In the projection system 1 according to the second embodiment, the image processing unit 22 of the personal computer 2 includes the image-data dividing unit 226. However, the projection system 1 according to the third embodiment is different in that, as shown in FIG. 9, the projectors 3A and 3B include image-data dividing units 326.

The image-data dividing units 326 divide, when the projectors 3A and 3B perform the tiling projection, image data transmitted from the personal computer 2 on the basis of positions of projected images of the respective projectors such that the respective projectors arrange the projected images in parallel and form one display image on the screen 5.

Figure 10:
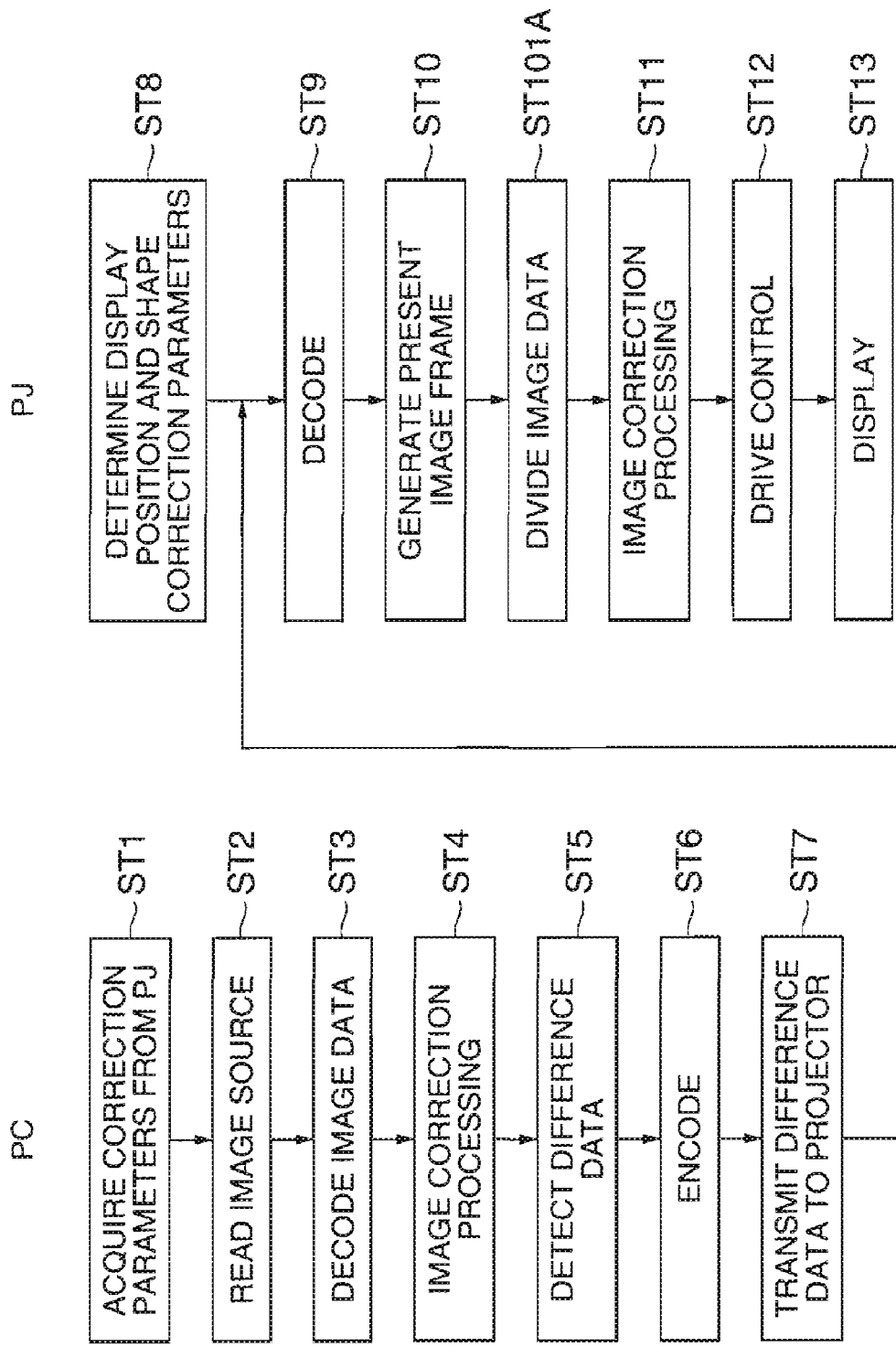
FIG. 10 is a flowchart for explaining operations of a projection system according to the third embodiment.

Concerning operations of the projection system 1 according to this embodiment, as shown in a flowchart in FIG. 10, in ST101A, the image-data dividing units 326 divide the present image frames generated by the present-image generating units 323.

In S11, the image correction arithmetic processing units 324 apply the individual image correction processing to partial image data to be displayed by the projectors 3A and 3B among the partial image data divided.

Processing in S12 and the subsequent steps is as explained in the first embodiment.

In this embodiment, it is possible to obtain actions and effects same as (1) and (2) in the first embodiment.

Moreover, the projectors 3A and 3B display partial images of an image that should be displayed on the basis of image data transmitted from the personal computer 2 and arrange the respective partial images in parallel to form one display image. Thus, it is possible to display a high definition image.

The projectors 3A and 3B perform the processing for dividing the image data into the partial image data. Thus, it is unnecessary to perform the processing for dividing the image data into the partial image data in the personal computer 2 and it is possible to reduce loads applied to the personal computer 2.

Fourth Embodiment

A projection system according to a fourth embodiment of the invention will be explained.

Figure 11:
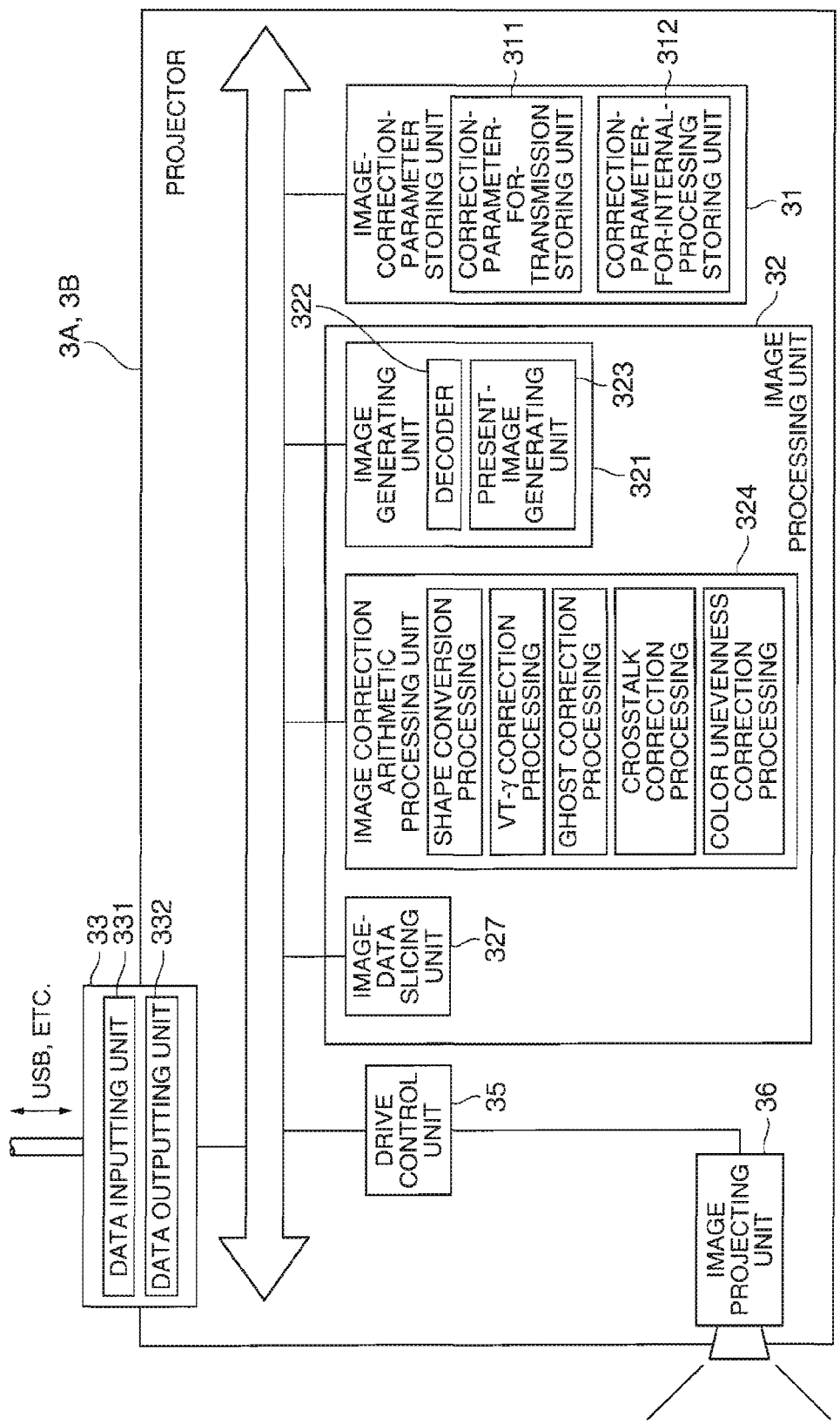
FIG. 11 is a functional block diagram of a projector according to a fourth embodiment of the invention.

In the projection system 1 according to the third embodiment, the projectors 3A and 3B include the image-data dividing units 326. However, the projection system 1 according to the fourth embodiment is different in that, as shown in FIG. 11, the projectors 3A and 3B include image-data slicing units (image-data slicing unit) 327.

The image-data slicing units 327 slice, when the projectors 3A and 3B perform tiling projection, image data transmitted from the personal computer 2 on the basis of positions of projected images of the respective projectors such that the respective projectors arrange the projected images in parallel to form one display image on the screen 5.

Figure 12:
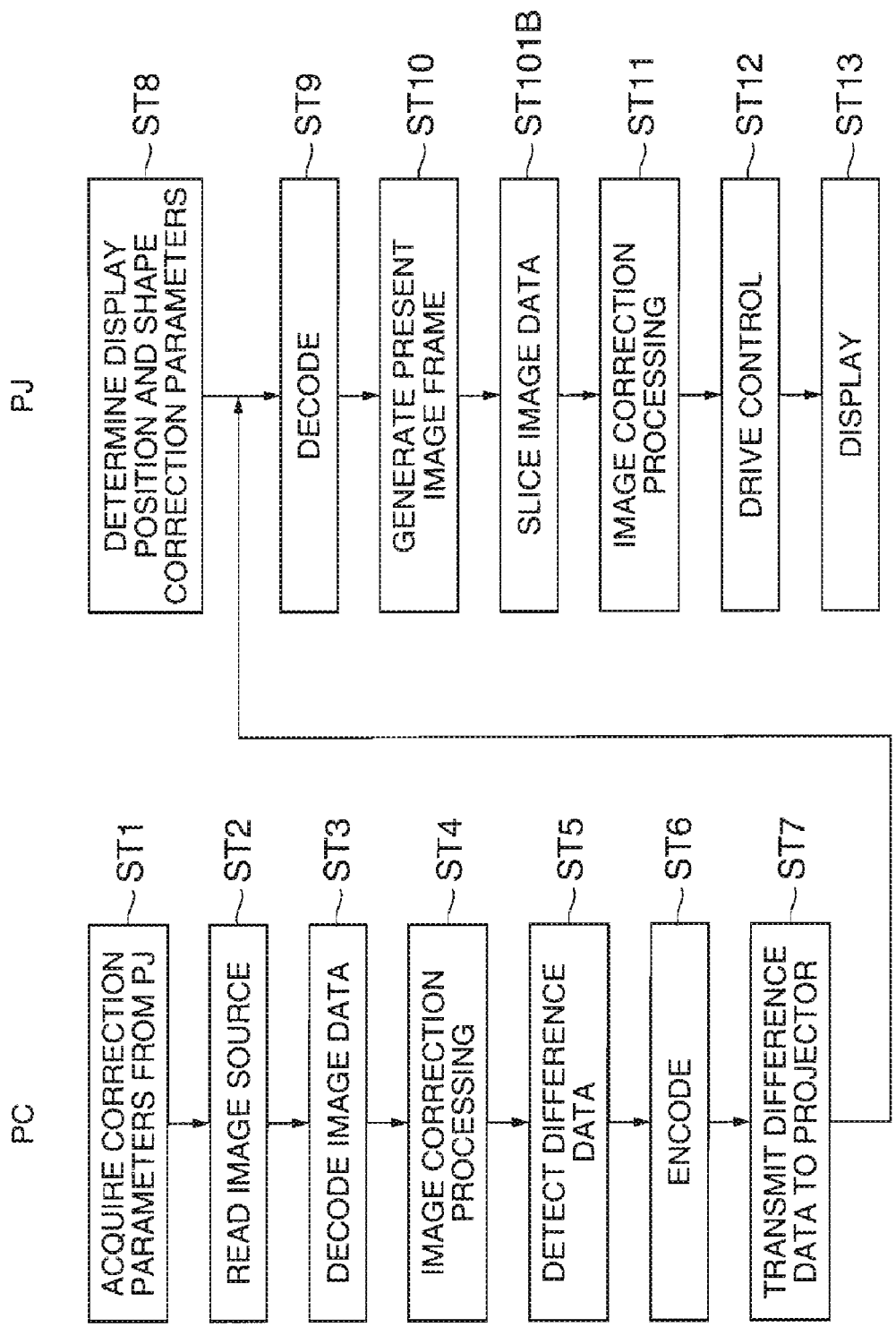
FIG. 12 is a flowchart for explaining operations of a projection system according to the fourth embodiment.

Concerning operations of the projection system 1 according to this embodiment, as shown in a flowchart in FIG. 12, in ST101B, the image-data slicing units 327 apply slicing of image data to the present image data generated by the present-image generating units 323.

The correction-parameter-for-internal-processing storing units 312 store parameters for performing slicing (hereinafter referred to as slicing parameters).

Figure 13:
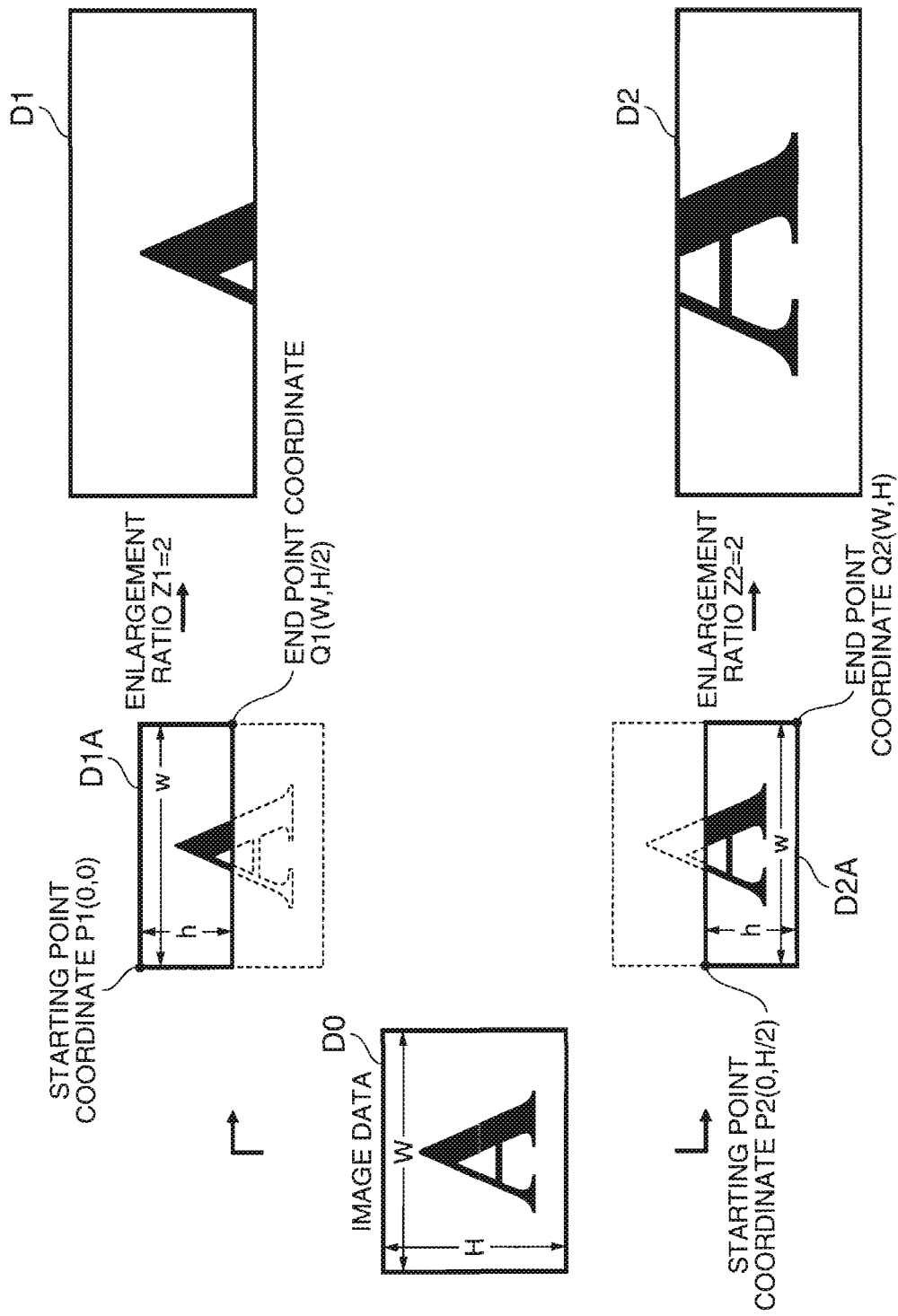
FIG. 13 is a diagram showing partial image data slicing processing carried out by an image-data slicing unit according to the fourth embodiment.

Examples of the slicing parameters include, as shown in FIG. 13, parameters formed by a starting point coordinate concerning a starting point of a range of partial image data in image data and an enlargement ratio.

The starting point coordinate is a coordinate P (e.g., P1, P2) for designating, as a slicing start position, for example, an upper left part of a rectangular area to be sliced. The enlargement ratios define enlargement ratios of image data sliced. As shown in FIG. 13, when a horizontal resolution of image data D0 is W, a vertical resolution of the image data D0 is H, a horizontal resolution of the rectangular area to be sliced is w, and a vertical resolution of the rectangular area is h, it is possible to represent an enlargement ratio as Z=W/w=H/h.

In this embodiment, it is assumed that an aspect ratio of original image data and an aspect ratio of the rectangular area to be sliced are identical. The enlargement ratio Z (Z1, Z2) is set equal to 2.

More specifically, the image-data slicing unit 327 of the projector 3A executes ST101B to generate partial image data D1 (FIG. 13) as described below.

In ST101B, the image-data slicing unit 327 calculates an end point coordinate Q1 (W, H/2) on the basis of a starting point coordinate P1 (0,0) and an enlargement ratio Z1, which are slicing parameters stored in the correction-parameter-for-internal-processing storing unit 312. The image-data slicing unit 327 slices image data D1A in a slicing range set by the starting point coordinate P1 read out from the image data D0 and the end point coordinate Q1 calculated. After this, in ST101B, the image-data slicing unit 327 enlarges the image data D1A sliced at the enlargement ratio Z1 to generate the partial image data D1.

The image-data slicing unit 327 of the projector 3B executes ST101B to generate partial image data D2 (FIG. 13) as described below.

In ST101B, the image-data slicing unit 327 calculates an end point coordinate Q2 (W,H) on the basis of a starting point coordinate P2 (0,H/2) and an enlargement ratio Z2 (FIG. 13), which are slicing parameters stored in the correction-parameter-for-internal-processing storing unit 312. The image-data slicing unit 327 slices image data D2A in a slicing range set by the starting point coordinate P2 read out from the image data D0 and the end point coordinate Q2 calculated. After this, in ST101B, the image-data slicing unit 327 enlarges the image data D2A sliced at the enlargement ratio Z2 to generate the partial image data D2.

In S11, the image correction arithmetic processing unit 324 applies the individual image correction processing to the partial image data generated.

Processing in S12 and the subsequent steps is as explained in the first embodiment.

In this embodiment, it is possible to obtain actions and effects same as (1) and (2) of the first embodiment.

Moreover, the projectors 3A and 3B display partial images of an image that should be displayed on the basis of image data transmitted from the personal computer 2 and arrange the respective partial images in parallel to form one display image. Thus, is it possible to display a high definition image.

The processing for slicing the partial image data displayed by the respective projectors from the image data is performed by each of the projectors 3A and 3B. Thus, it is unnecessary to perform the processing for dividing the image data into the partial image data in the personal computer 2 and it is possible to reduce loads applied to the personal computer 2.

The invention is not limited to the embodiments described above. Modifications, alterations, and the like in range in which the objects of the invention can be attained are included in the present invention.

For example, in the embodiments, the projectors 3A and 3B perform the stack projection according to the serial connection. However, the projectors 3A and 3B may perform the stack projection according to the parallel connection. In short, image data subjected to the image correction processing by the common image correction processing unit of the information processing apparatus only has to be received through the signal transmitting device.

In the embodiments, the stack projection and the tiling projection are performed using the two projectors 3A and 3B. However, two or more projectors may be used. In short, the number of projectors in use only has to be determined according to an environment in which the projection system is used or the like.

In the embodiments, in the tiling projection, the respective partial images projected by the projectors 3A and 3B do not overlap each other and one display image is formed by the respective partial images. However, the invention is not limited to this. The partial images may partially overlap each other to form one display image.

In this case, it is preferable to adjust brightness of an overlapping area of the partial images to make the overlapping area less conspicuous. For example, the brightness of the overlapping area of the partial images is optically adjusted. In other words, an amount of light of a part of the partial images expanded and projected is adjusted by a shielding plate. Further, for example, image correction processing for adjusting brightness (luminance and colors) is applied to image data corresponding to the overlapping area of the partial image data.

As the common image correction processing and the individual image correction processing, processing other then the processing cited as the examples in the embodiments may be performed. The processing cited as the examples in the embodiments may be changed to the common image correction processing and the individual image correction processing as required.

For example, when a lens sift function is implemented on the respective projectors and it is possible to translate a projected image with the lens shift function when the stack projection and the tiling projection are performed, image correction processing is necessary because of a common cause such as the tilt of the screen. Thus, the shape conversion can be the common image correction processing.

In the embodiments, the personal computer 2 is used as the information processing apparatus. However, for example, a board computer may be used. In short, any information processing apparatus may be used as long as the information processing apparatus can apply predetermined image processing to an inputted image source and generate image data for output.

In the embodiments, the USB cables 4A and 4B are used as the signal transmitting devices. However, for example, an IEEE1394 cable, a DVI cable, and the like may be used. Moreover, the signal transmitting device may be a radio signal transmitting device. In short, any signal transmitting device may be used as long as the signal transmitting device can transmit image data generated by the information processing apparatus.

In the embodiments, the encoder 225 calculates a difference between image frames, detects a changed portion and sets the changed portion as difference data, transmits the difference data as transmission data. However, other data format may be used. Moreover, the image data may be directly transmitted as transmission data. In short, the image data only has to be transmitted to the respective projectors through the signal transmitting devices.

The entire disclosure of Japanese Patent Application Nos. 2006222295, filed Aug. 7, 2006 and 2006-238613, filed Sep. 4, 2006 are expressly incorporated by reference herein.

What is claimed is:

1. A projection system comprising:
   plural projectors respectively including:
      an image-data restoring unit that converts transmission data transmitted from a information processing apparatus to image data;
      an individual image correction processing unit that applies individual kinds of image correction processing corresponding to each of the projectors to the image data converted by the image-data restoring unit; and
      an image projecting unit that modulates a light beam emitted from a light source on the basis of corrected image data corrected by the individual image correction processing unit and projects an image;
   a signal transmitting device that connects an information processing apparatus and the respective projectors and transmits the transmission data generated by the information processing apparatus to the respective projectors; and
   the information processing apparatus including:
      a common image correction processing unit that generates image data obtained by applying image correction processing common to the respective projectors to the image source in order to cause each of the projectors to display an appropriate image; and
      an image-data transmitting unit that converts the image data generated by the common image correction processing unit into the transmission data and transmits the transmission data to the respective projectors through the signal transmitting device.

2. A projection system according to claim 1, wherein the projection system is a stack projection system that superimposes and displays projected images of the respective projectors in an identical projection area.

3. A projection system according to claim 1, wherein the projection system is a tiling projection system that causes the respective projectors to display partial images of an image that should be displayed on the basis of the image data and arrange the respective partial images in parallel to form one display image.

4. A projection system according to claim 3, wherein the information processing apparatus includes an image-data dividing unit that divides the image data into partial image data that should be displayed by the respective projectors.

5. A projection system according to claim 3, wherein each of the projectors includes an image-data dividing unit that divides the image data into partial image data that should be displayed by the respective projectors.

6. A projection system according to claim 3, wherein the each projector includes an image-data slicing unit that slices partial image data that should be displayed by the respective projectors from the image data.

7. An information processing apparatus comprising:
   a common image correction processing unit that generates, in order to cause each of plural projectors to display an appropriate image, image data obtained by applying image correction processing common to the respective projectors to an inputted image source; and an image-data transmitting unit that converts the image data generated by the common image correction processing unit into predetermined transmission data and transmits the transmission data to the respective projectors through a signal transmitting device.

8. An information processing program recorded on a non-transitory computer-readable recording medium and executed in an information processing apparatus, the information processing program causing the information processing apparatus to execute:

a common image correction processing procedure for generating, in order to cause each of plural projectors to display an appropriate image, image data obtained by applying image correction processing common to the respective projectors to an inputted image source; and an image-data transmitting procedure for converting the image data generated by the common image correction processing procedure into predetermined transmission data and transmitting the transmission data to the respective projectors through a signal transmitting device.

9. A projector for use with a plurality of projectors and an image processing apparatus in a projection system, the image processing apparatus generating image data for each of the plurality of projectors by applying image correction processing, common to the plurality of projectors, to an image source, the projector comprising:

an individual image correction processing unit that applies individual kinds of image correction processing, corresponding to the projector, to the image data; and an image projecting unit that modulates a light beam emitted from a light source on the basis of corrected image data corrected by the individual image correction processing unit and projects an image.

* * * * *